Sept. 26, 1950 — M. McENARY — 2,523,440
PULLEY WITH THREADING MEANS
Filed Dec. 1, 1947
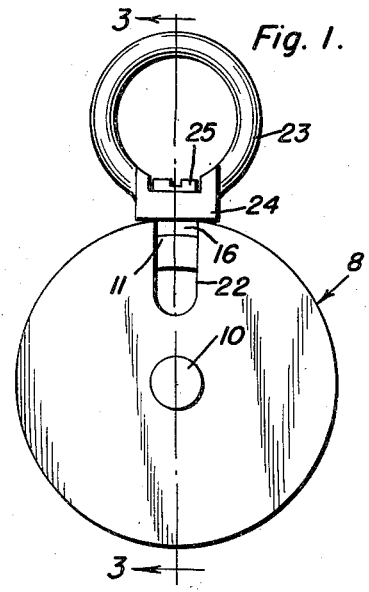
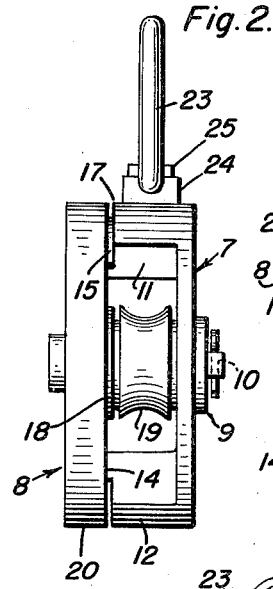
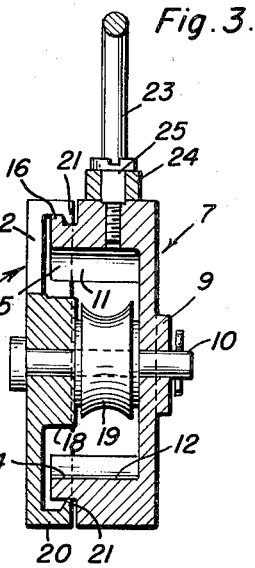
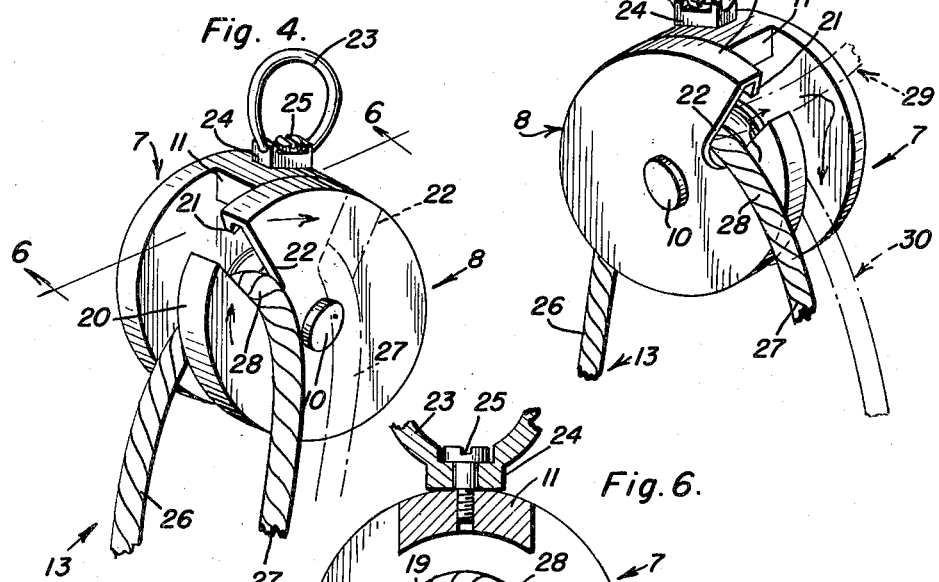
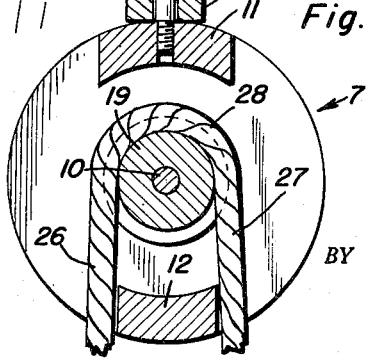
Michael Mc Enary
INVENTOR.

Patented Sept. 26, 1950

2,523,440

UNITED STATES PATENT OFFICE 2,523,440

PULLEY WITH THREADING MEANS

Michael McEnary, La Salle, Ill.

Application December 1, 1947, Serial No. 789,012

2 Claims. (Cl. 254—194)

The present invention relates to an improved pulley which is so constructed that the line, for instance, a rope or the like, may be readily attached thereto and detached therefrom.

It is a matter of common knowledge that, ordinarily, when one sets out to thread a pulley, one end of the rope or other line is generally pushed endwise between the grooved periphery of the pulley wheel and the yoke or other frame part in which said wheel is mounted for idling. If the rope is a little stout, threading the end between the roller and harnessing frame often requires one to jam the rope through with an instrument and then, with a pair of pliers or the like, catch hold of the free tip and thus inconveniently thread same. The purpose of the present invention is to so construct the pulley that the portion of the rope which is to be trained over the grooved pulley wheel need simply be bent into looped form and shiftably rotated and then easily "threaded" in place.

More specifically, in carrying out the principles of the invention, I provide a pulley wherein the part forming the guard is made up of rotatably connected companion parts, one of which is provided with the pulley wheel and the other with a rope-accommodating notch which is so situated and related to other features that it becomes an easy matter to attach and detach the rope.

Other objects and advantages of the invention will become more readily apparent from the following description and the accompanying illustrative drawings.

In the drawings, wherein like numerals are employed to designate like parts throughout the views:

Figure 1 is a front or face elevational view of a pulley constructed in accordance with the present invention.

Figure 2 is an edge elevation of the structure seen in Figure 1, observing same, let us say, from right to left.

Figure 3 is a central vertical sectional view on the line 3—3 of Figure 1, looking in the direction of the arrows.

Figure 4 is a perspective view showing a looped or bent portion of the rope inserted into the applicator notch, which represents the initial step of "threading" the rope in place.

Figure 5 is a perspective view, at a slightly different angle, and showing the next step or steps completing the necessary procedure of "pulley-threading" the rope in place.

Figure 6 is a longitudinal sectional view on the plane of the line 6—6 of Figure 4 with the rope pulley in place.

Referring now to the drawings by distinguishing reference numerals, the principal members or units which go to make up the body or frame structure are denoted by the numerals 7 and 8, each being a disk. Disk 7 has a hub 9 to accommodate a headed bolt or axle pin 10. Said disk 7 also includes a pair of diametrically opposite lateral lugs 11 and 12, respectively, and these lugs constitute confining guards for a rope or equivalent line 13. One lug or guard, 12, has an outstanding lip 14 and the other guard 11 has a similar lip-like extension 15 with an arcuate flange 16 defining a keeper-groove, as shown at 17 in Figures 2 and 3.

The cover unit, member 8, comprises a disk having a central hub portion 18 (see Figure 3) to accommodate the adjacent end portion of the axle pin 10, which pin, when assembled, serves to accommodate a small pulley wheel 19. The cover disk also has a lateral substantially endless flange 20 carrying a correspondingly constructed, inturned lip 21 forming a key. The latter has a bevelled inner surface and fits into the groove or keyway 17, as shown in Figure 3 and thus, by way of the pin 10 and the cotter key and flange 16 and flanges 20 and 21, the two disks are assembled to form the frame-like body portion of the pulley. The cover disk is also provided with a rope accommodating notch 22 which opens at its outer end through the peripheral portion of said cover disk. The numeral 23 designates a hanger ring provided with a collar 24 which is swivelly bolted, as at 25, to the lug 11.

Reviewing the structure, it will be seen that the body is made up of two disks opposed in approximate parallelism and separably pinned together with a pin and cotter pin (although the same could be bolted), one disk having said lateral diametrically opposite guard forming lugs to confine the rope, once it is in position, and one lug having a keyway, the remaining part having flange means fitting rotatably in the keyway to, in conjunction with the pin, serve to assemble the body parts. The pin means also permits the disk 8 to be rotated freely at all times except when pulley is in operation, when the strain of the rope on pulley 19 tightens cover disk in by tightening rim 21 in groove 17 and key 16 in groove in cover disk 8. Thus, when rope is tight disk 8 is tight and when rope is loose disk 8 is free to rotate. Cover disk 8 must not be tight at any time except when in use. When in use it is automatically tight, as explained.

By shifting the notch to the left, as seen in Figure 4, it is possible to hold one end portion 26 of the rope between disks 7 and 8 and in contact with the periphery of the pulley wheel 19. The other end portion 27 is then looped or bent, as at 28, to seat itself in the notch. Now, by shifting the notched part 8 from left to right and swinging the notch to and then beyond the left-hand portion of the guard lug 11, it takes the position seen in Figure 5. Here, the rope is partly applied around the pulley and then, by lifting up the bent portion 8 and disengaging it from the notch and swinging it up and out of the notch, as indicated at 29, the next step consists in then swinging the rope down to the further dotted line position 30. Now the rope is completely looped around the grooved portion of the pulley to take the position shown in Figure 6.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A self-threading pulley of the class shown and described comprising a flat disk provided on its outer peripheral edge with a pair of laterally disposed diametrically opposite rope retaining and guard lugs, a second disk opposed in parallelism to said first-named disk, a bolt joined centrally with the respective disks, a pulley mounted for idling on said bolt and located between said disks; said second-named disk having a marginal flange overlapping and surrounding the free end portions of the respective lugs and provided at a predetermined point with a radial rope-accommodating notch opening through the said flange.

2. A self-threading pulley of the class shown and described comprising a disk provided on its outer peripheral edge with a pair of laterally projecting diametrically opposite lugs, the outer free end portion of one lug having an arcuate extension lip, the outer end of the remaining lug having a groove constituting a keeper, a second complemental disk opposed in parallelism to the first-named disk, a bolt piercing the central hub portions of the respective disks and joining said members in complemental relationship, the outer peripheral edge of the second named disk having a flange and a radial rope-accommodating notch in the second disk opening at its outer end through said flange, the free edge of said flange having an inturned lip and said lip constituting a keying element and fitting movably in said keeper groove.

MICHAEL McENARY.

REFERENCES CITED

The following references are of record in the file of this patent:

UNITED STATES PATENTS

| Number | Name | Date |
|---|---|---|
| 1,733,640 | Wright | Oct. 29, 1929 |